United States Patent [19]

Carlson et al.

[11] Patent Number: 4,694,989
[45] Date of Patent: Sep. 22, 1987

[54] CONTROL INSTALLATION FOR VARIABLE VOLUME AIR DIFFUSERS

[75] Inventors: Melvin C. Carlson, Kansas City, Mo.; Raymond H. Dean, Shawnee Mission, Kans.

[73] Assignee: Tempmaster Corporation, North Kansas City, Mo.

[21] Appl. No.: 938,576

[22] Filed: Dec. 5, 1986

Related U.S. Application Data

[62] Division of Ser. No. 837,888, Mar. 10, 1986, Pat. No. 4,648,552.

[51] Int. Cl.⁴ .............................................. F24F 13/10
[52] U.S. Cl. ........................................ 236/49; 137/82; 236/80 R
[58] Field of Search ............... 236/49, 85, 80 R, 80 F; 137/82; 248/188.4, 650, 656

[56] References Cited

U.S. PATENT DOCUMENTS 3,791,397  2/1974  Jann ...................................... 137/82
3,806,027  4/1974  Ginn et al. ...................... 236/80 R X
3,941,310  3/1976  Travaglio .............................. 236/49
4,077,567  3/1978  Ginn et al. ............................ 236/49
4,147,298  4/1979  Leemhuis .............................. 236/49
4,312,475  1/1982  Edwards et al. ...................... 236/49
4,356,963  11/1982  Edwards et al. .................... 236/49

Primary Examiner—William E. Tapolcai
Attorney, Agent, or Firm—Kokjer, Kircher, Bradley, Wharton, Bowman & Johnson

[57] ABSTRACT

In a self-powered diffuser for a variable volume air distribution system, an installation for the control components which facilitate adjustment, modification and system start up. A Tee fitting located in the control compartment feeds through the bulkhead and into the diffuser to sense the flow rate of air in the diffuser. One leg of the Tee fitting is available to receive a tube in order to permit servicemen to actually measure the flow rate from below the ceiling. The maximum flow rate is adjustable from below the ceiling and is carried out by an adjustment mechanism having enhanced stability and reliability. A thermostat in the control compartment can be installed, serviced and replaced if necessary from below the ceiling.

14 Claims, 5 Drawing Figures

CONTROL INSTALLATION FOR VARIABLE VOLUME AIR DIFFUSERS

This is a division of application Ser. No. 837,888, filed Mar. 10, 1986, now U.S. Pat. No. 4,648,552.

BACKGROUND OF THE INVENTION

This invention relates generally to the controls for an air conditioning system and more particularly to an improved installation which facilitates servicing and adjustment of the control components for a variable volume air diffuser.

U.S. Pat. Nos. 4,399,739 to Dean; 4,356,963 to Edwards et al., 4,331,291 to Dean and 4,312,475 to Edwards et al. relate to variable volume air distribution systems in which operating power for the flow control mechanism is obtained from the high pressure air supply in the ventilating ducts of a building. As described in the aforementioned patents, a variable volume control device and an air diffuser can be combined in a single integrated assembly to provide an economical unit for controlling the distribution of conditioned air to a relatively large number of temperature control zones. Devices in which the duct pressure is used to supply operating power for the controls are commonly referred to in the industry as self-powered controlled diffusers.

In office buildings and other large facilities having a number of different zones for distribution of conditioned air, a relatively large number of control units must be installed and properly adjusted prior to occupancy of the building. Consequently, the amount of materials needed and the cost of labor required to install and initially adjust the controls represents a significant economic factor. Prior to installation, decisions are made as to which units are to be operated as stand alone units and which are to be operated in a master/slave relationship in groups controlled by common thermostats. Based on these decisions, the installation is carried out by arranging and connecting the different units in the appropriate fashion to function as intended. Later, after installation of the control units has been completed and the ceiling tiles or other building components are in place, it is necessary to operate the system and to make certain that it complies with engineering specifications. Typically, this is done by adjusting the control units to obtain the maximum air flow rate and comparing the measured maximum rate with the maximum design rate. After the system has been in operation for some time following occupancy of the building, it is not uncommon for changes to be made in the configuration or usage of the spaces which are served by the units. In this event, readjustments are required and it is sometimes even necessary for the units to be connected differently to best serve the new space arrangement.

In the past, attempts to minimize the field labor required for adjustment of the control units have involved either the preadjustment of the controls at the factory or the provision of a precalibrated dial on the control unit to facilitate adjustment in the field. Experience has shown that neither of these approaches has been successful in dealing with all of the problems noted above. If the controls are adjusted at the factory, it is necessary for each unit to be specially designated for a particular installation and at a particular place in that installation. This is undesirable because of the need to make detailed accountings as to which unit goes where and, perhaps even more importantly, because of the frequent occurrence of last minute changes necessitated by unforeseen circumstances. The use of a precalibrated dial on the control is equally unsatisfactory because many technicians are unwilling to accept that the flow rate is as specified unless they actually measure it to confirm that it is as specified.

Another drawback associated with all presently available self powered controlled diffusers is that access to their adjustment mechanisms is difficult at best. Some units require a cumbersome disassembly of a rather expensive apparatus and others have adjustment devices that are accessible only when access through the ceiling is provided. In ceilings having lift out ceiling tiles, access is possible without undue difficulty, but even then, a tall ladder is needed and the adjustment must be made in the dark area above the ceiling. If the ceiling is a more permanent structure, it is easy to appreciate that adjustment is much more difficult and usually impractical.

It is also beneficial in a number of respects for the diffuser mounted thermostat to be capable of being installed and removed from below the ceiling. This makes it easier to assure a wide open thermostat condition during adjustment of the high limit of the control. It is also makes inspection and replacement of the thermostat easier in the event that problems arise with a defective thermostat.

An ability to measure flow during adjustment is also important. Preferably, one should be able to make the measurement by attaching a gage to a measurement port accessible from below the ceiling.

Moreover, slave units can be converted to stand alone units easily at a later time when the building has been completed and is occupied.

The aforementioned U.S. Pat. Nos. 4,356,963 and 4,312,475 disclose cam operated adjustment dials used for adjustment of the maximum flow rate. The main problem with this type of adjustment mechanism is that the exhaust line can wobble and unpredictably change its height and angle of closure with the diaphragm. Access to the adjustment dial is also difficult from below the ceiling.

SUMMARY OF THE INVENTION

The present invention is directed to an improved installation of the controls for a variable air volume diffuser, and among its objects are to provide an installation in which actual measurement of the air flow is facilitated, adjustment of the maximum flow rate is easily made from below the ceiling, and the thermostat can be installed and removed from below the ceiling.

In accordance with the invention, the control components are housed in a control compartment which is separated from the plenum and air diffuser by a transverse bulk head. The pneumatic line of the control circuit to which the flow velocity signal is applied is connected with one leg of a Tee fitting having a second leg feeding through the bulkhead and connected with a perforated or slotted tube that extends within the air diffuser to sense the air flow rate. The third leg of the Tee points downwardly and is located next to the bulkhead where a tube inserted from below the ceiling can be slipped over it after being guided along the bulkhead. Because the flow measurement is made on the low pressure side of the system, the third leg of the Tee can be vented so long as its port is maintained small enough to avoid substantially degrading the performance of the device. The Tee fitting is recessed up in the control compartment where it is out of sight and yet can be accessed easily for measurement of the flow rate by technicians and service men.

In accordance with another aspect of the invention, an improved mechanism is provided for adjustment of the control to vary the maximum air discharge rate. The mechanism includes a long screw which is threaded through an elongated sleeve. A cylindrical tip on the end of the screw fits closely in a mating pocket formed in a bracket that extends from the exhaust tube which is axially adjustable in order to adjust the maximum flow rate. A spring acts on the bracket to hold it against the screw so that threaded advancement and retraction of the screw effects axial adjustment of the exhaust tube. The close fit of the tip of the adjustment screw in the pocket, along with the long surfaces of contact between the sleeve and screw, prevent the mechanism from wobbling significantly, and the stability of the adjustment mechanism is enhanced accordingly. At the same time, the screw extends down to the slot in the control compartment where it is easily accessible from below the ceiling when adjustment is required.

Another important feature of the invention is the arrangement of the installation to permit insertion and removal of the thermostat from below the ceiling. A spring clip is provided in the control compartment to hold the thermostat at the proper position, and a foam insulating block is strategically located to seal the thermostat housing against infiltrating cold air from cracks in the ductwork or other components of the air distribution system. By virtue of the access that is provided to the thermostat lines with appropriate preparation, the control unit can easily be modified from a "slave" configuration to a stand alone configuration, entirely from below the ceiling.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
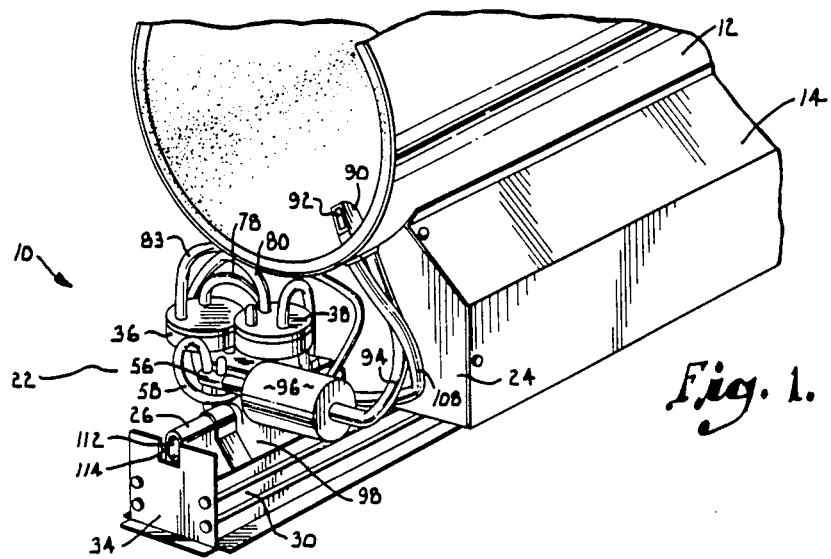
FIG. 1 is a fragmentary perspective view showing a ventilating duct and air diffuser equipped with a control installation constructed according to a preferred embodiment of the present invention.
Figure 2:
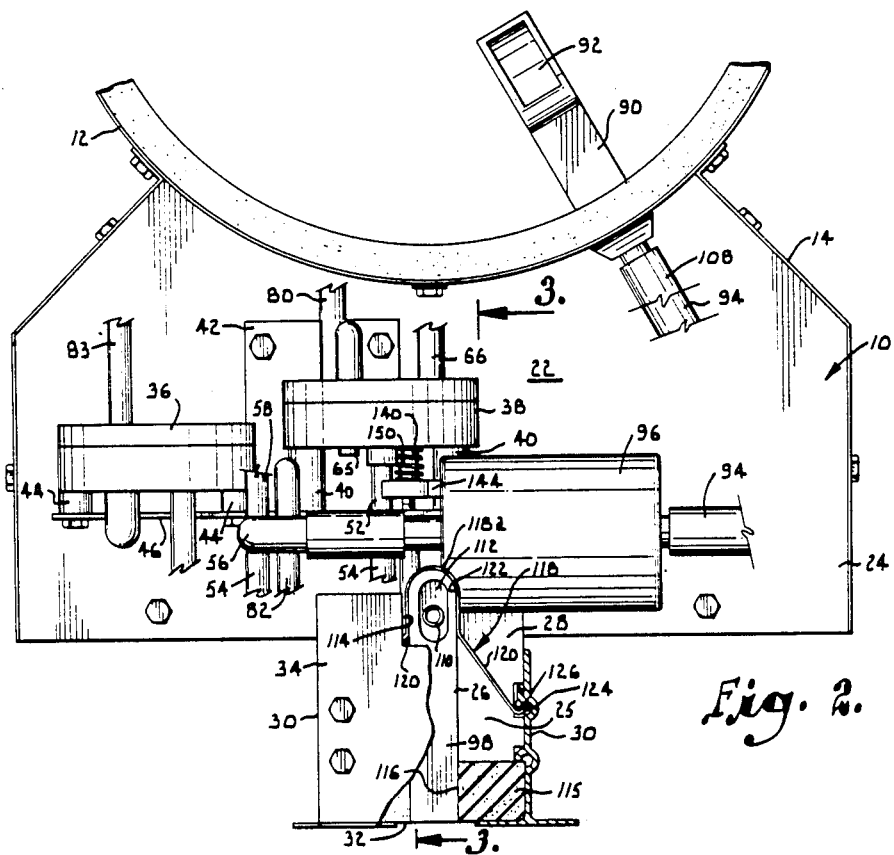
FIG. 2 is an end elevational view of the control installation shown in FIG. 1, with portions broken away for simplicity and for purposes of illustration.

The present invention is directed to a control installation which is generally designated by numeral 10 in FIGS. 1 and 2 and which serves to control the distribution of conditioned air in a building. The conditioned air is passed by a fan (not shown) through ductwork which includes a duct 12 having an underlying plenum 14. An air diffuser 16 (FIG. 3) receives conditioned air from the plenum 14 and discharges it through the usual diffuser slot 18 into the conditioned space served by the control installation 10. Diffuser 16 an the other components of the air distribution system are ceiling mounted, and the discharge slot 18 is normally flush with the ceiling of the conditioned pace served by the diffuser.

The components of the control installation 10 are for the most part identical to those described in U.S. Pat. No. 4,331,291 which issued to Raymond H. Dean on May 25, 1982 and which is incorporated herein by reference. As described in the aforementioned Dean patent, a pneumatic control circuit acts to inflate and deflate an actuator bag 20 (FIG. 3) which serves as a flow control device to control the flow of conditioned air from the duct 12 into the plenum 14 and through the diffuser slot 18.

The operating components of the pneumatic circuit in the control installation 10 are housed in a control compartment 22 which is separated from the plenum 14 by a transverse bulk head 24 secured to extend across the end of the plenum. The control compartment 22 includes on its lower portion a thermostat compartment 25 (FIG. 2) which houses an aspirating type thermostat 26. The thermostat compartment 25 is formed as an extension of the diffuser 16 and is separated from the diffuser by a bulkhead or partition 28 which forms a downward extension of bulkhead 24. The thermostat compartment 25 has opposite sides 30 which are extensions of the sides of the air diffuser, and it also includes a slot 32 which is formed as an extension of the diffuser slot 18. An end plate 34 defines the end of the thermostat compartment opposite partition 28.

Included in the control components of the installation 10 are a pressure regulator 36 and a pneumatic amplifying control relay 38. Extending downwardly from the body of the relay 38 are a pair of vertical posts 40 secured at their lower ends to an L shaped mounting bracket 42 which is connected with the bulkhead 24. The body of the pressure regulator 36 is provided with a pair downwardly projecting feet 44 (FIG. 2) which are secured at their lower ends to a horizontal plate 46 which forms an extension on one side of the mounting bracket 42.

Figure 3:
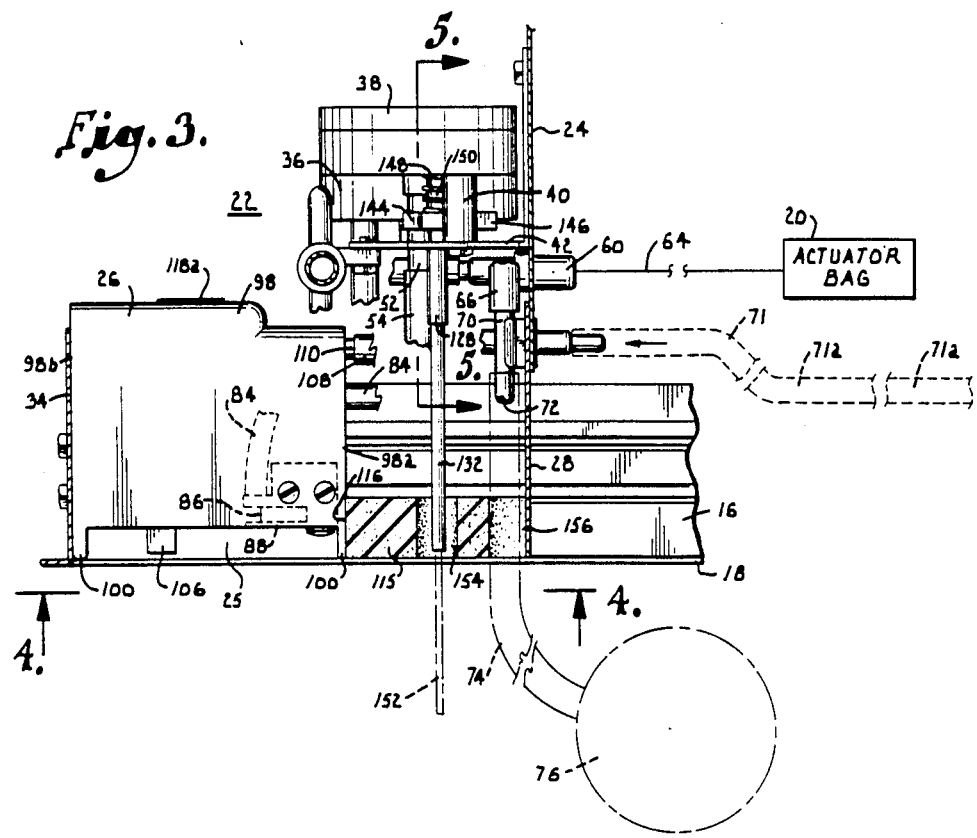
FIG. 3 is a fragmentary sectional view taken generally along line 3—3 of FIG. 2 in the direction of the arrows, with portions broken away for simplicity and for purposes of illustration.

The amplifying control relay 38 is of the same general type as that shown in U.S. Pat. No. 4,331,291 which is incorporated herein by reference. As explained in the referenced patent, relay 38 has an internal diaphragm 48 (FIG. 5) which controls the bleeding of air through an exhaust port 50 formed on the upper end of an exhaust tube 52. The exhaust tube 52 connects telescopically with a hose 54 which extends to a manifold 56. Another hose 58 extends from manifold 56 and connects with a fitting 60 which extends through the bulkhead 24 as best shown in FIG. 3. The actuator bag 20 is connected with the fitting 60 by line 64, and the condition of the actuator bag controls the rate at which air is able to pass from the duct 12 into the plenum 14.

Relay 38 has an exhaust port 65 (FIG. 2). Also extending from the relay 38 is a velocity sensing line 66 which applies to the relay a signal indicative of the discharge velocity of the conditioned air. As best shown in FIG. 3, line 66 connects with the top leg of a Tee fitting 68 having its horizontal leg extending through and connected with the bulkhead 24. Within the plenum 14, the horizontal leg of fitting 70 connects with a sensor tube 71 having a plurality of spaced apart perforations or slots 71a located to sense the velocity of the air that is discharging into the conditioned space from the air diffuser 16.

Figure 4:
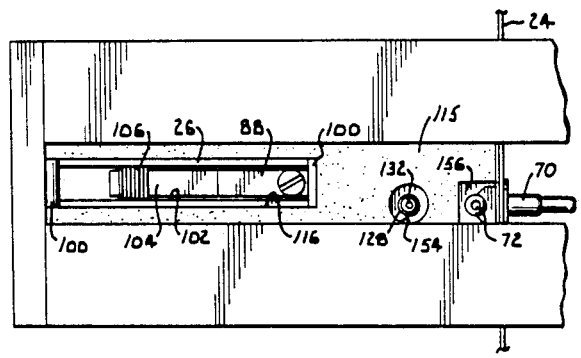
FIG. 4 is a fragmentary bottom plan view taken generally along line 4—4 of FIG. 3 in the direction of the arrows.

The third leg of the Tee fitting 70 extends downwardly along the surface of bulkhead 24 and terminates at its lower end in a small port 72 (FIG. 4). Port 72 is recessed well up in the control compartment 22 and is located adjacent to the bulkhead 24 at location well above slot 32.

Port 72 serves the purpose of allowing an actual measurement to be taken of the velocity of the discharging air. When a measurement is to be taken, a tube 74 (FIG. 3) carrying a gauge 76 on its end can be extended upwardly through slot 32 from below the ceiling. Tube 74 can be guided along the partition 28 of the bulkhead such that its end can easily be fitted on the lower end of the Tee fitting 70 and over the port 72. The pneumatic velocity signal which is present at port 72 is then transmitted through tube 74 to the gauge 76. Little difficulty is involved in properly applying the tube 74 to the Tee fitting 70 because the tube can be guided along the surface of partition 28.

Port 72 is preferably uncapped so that it continuously bleeds to the atmosphere. This can be done without appreciably degrading the performance of the control so long as the effective cross sectional area of the port 72 is no greater than about 10% of the total effective area presented by the slots 71a in the velocity sensing tube. When port 72 is this small, the amount of air that bleeds through it is too small to have a significant adverse affect on the performance of the unit. Consequently, the size of port 72 is maintained at less than 10% the combined size of perforations or slots 71a.

The pressure regulator 36 is identical to that shown in patent application Ser. No. 775,533, filed Sept. 13, 1985 by Raymond H. Dean, which application is incorporated by reference herein. The pressure regulator 36 is connected with relay 38 in the manner shown in FIG. 2 of the referenced application. The regulator 36 has a loop 78 which connects the control and output chambers located on opposite sides of its diaphragm (not shown). The regulator 36 has an output line 80 which extends from its underside for output chamber to connection with the top side of relay 38. A supply line 82 which supplies operating power to the regulator 36 extends from manifold 56 to the underside (output chamber) of the regulator. Regulator 36 also has a thermostat line 83 which extends from the top side of the regulator to connection with a tube 84 extending from the thermostat 26a, as shown in FIG. 3. The thermostat tube 84 terminates in a port 86 which is controlled by a metal strip 88 included in the thermostat.

The pressure of the primary air supply in duct 12 is picked up by a fitting 90 which is mounted in the duct and has an opening 92 for receiving the duct pressure. The duct pressure is transmitted from fitting 90 along hose 94 to a filter 96, and from the filter to the manifold 56. The supply pressure is transmitted from manifold 56 to lines 54, 58 and 82.

The thermostat 26 is an aspirating type thermostat having a thin generally rectangular housing 98. A pair of feet 100 project from the bottom of housing 98. Between the feet 100, the bottom of the thermostat housing 98 is open to provide a slot 102 into which air is drawn from the conditioned space located below slot 32. Mounted in the thermostat housing 98 adjacent to slot 102 is a temperature sensitive bimetal strip 104 which acts on strip 88 in a manner to move strip 88 toward and away from port 86. The bimetal strip 104 can be adjusted by a lever 106 in order to thereby adjust the setting of the thermostat. It is noteworthy that lever 106 is located adjacent to slot 32 and is readily accessible from below the ceiling.

Thermostat 26 is an aspirating type thermostat to which aspirating air is supplied through a hose 108 which extends from the supply pressure pick-up fitting 90 and connects with a tube 110 that leads into the thermostat housing 98. Tube 110 extends into a horizontal aspirating passage 112 which is formed through the top portion of the thermostat housing and which communicates with the open slot 102 on the bottom end of the thermostat. As best shown in FIG. 1, the aspirating passage 112 has its outlet end aligned with a cutout 114 formed in end plate 34 in order to accommodate the aspirating air supplied from the duct 12. The aspirating air which flows through passage 112 acts by aspiration to draw air from the conditioned space into slot 32 and through the slot 102 on the bottom end of the thermostat housing. This aspirating action insures that the temperature sensitive bimetal strip 104 in the thermostat is exposed to air which is representative of the temperature in the conditioned space.

A compliant foam rubber thermal insulating block 115 is closely fitted in the bottom portion of the thermostat compartment 25. The insulating block 115 extends between the opposite sides 30 of the thermostat compartment and is glued or otherwise secured in place to the sides 30 and to the bottom flanges located on opposite sides of slot 32. A slot 116 is formed through block 115 and has a size to closely receive the lower portion of the thermostat housing 98. The insulating block 115 serves to seal the bottom portion of the thermostat (where the temperature sensitive bimetal strip 104 is located) against infiltrating cold air leaking through cracks in the ductwork or other components of this system. The close fit of the thermostat housing in slot 116 also prevents significant side to side wobble of the thermostat housing. The slot 116 also maintains the thermostat firmly against the end plate 34 of the thermostat compartment where the thermostat is located as far as possible from the active portion of the air diffuser 16 through which relatively cool conditioned air passes.

The thermostat 26 is held in place in the thermostat compartment 25 by a metal spring clip which is generally designated by numeral 118 and which is best shown in FIG. 2. The spring clip 118 includes opposite legs 120 which diverge as they extend downwardly from a relatively narrow throat 122 formed on the spring clip between the upper portions of the opposite legs 120. The legs 120 have out turned flanges 124 on their lower ends which engage the opposite sides 30 of the thermostat compartment and are preferably received in pockets 126 formed in the sides 30. The spring construction of the spring clip causes the legs 120 to be urged outwardly by spring action in order to maintain them against the opposite sides 30, thereby holding the spring clip in place. The throat 122 is aligned above slot 116 in the insulating block 115, and the throat has a size to closely accommodate the upper portion of the thermostat housing 98. When the thermostat housing is pressed into the throat 122, the legs 120 on opposite sides of the throat grip firmly against the opposite sides of the thermostat housing to hold the thermostat in place.

Initial installation of the thermostat 26 is achieved by first connecting the thermostat tubes 84 and 110 to the respective hoses 84 and 108. The thermostat housing can then be inserted upwardly through slot 116 with one end 98a facing diagonally upwardly. The compliance of the foam rubber allows it to be compressed as the thermostat is pushed up into the slot. Once the thermostat housing has been passed through slot 116, it is rotated into its normal upright position shown in the drawings. The corner of the thermostat housing engages the end plate 34 as it is rotated, and the end 98b of the thermostat housing then remains in contact with plate 34 as the thermostat "clicks" into a square upright position. Then, the thermostat can be pushed fully upwardly by pressing on the feet 100 until the thermostat is fully inserted into the throat 122 of the spring clip 118 and against the curved bight 118a on top of clip 118. The spring clip thereafter holds the thermostat securely in place.

It is noted that the thermostat can be initially installed in this manner from below the ceiling. It is also noteworthy that the motions and actions required to insert the thermostat are easy and natural and do not require complicated procedures. The spring clip 118 limits the upward movement of the thermostat and holds the top of the thermostat housing against side to side wobble. The legs 120 grip firmly against opposite sides of the thermostat to hold it in place and prevent it from falling downwardly out of the slot 32. It is noteworthy that the thermostat is gripped near its top end at a location remote from the temperature sensitive element 104 and adjacent to the aspirating air passage 112. Consequently, any cold that is conducted through the thermostat body by the metal spring clip 118 is carried away by the aspirating air flowing through the passage 112 before it is able to affect the sensing element 104.

The thermostat can be removed for inspection, servicing or replacement simply by pulling downwardly to remove it from the spring clip 118 and then withdrawing it through slot 32 by reversing the steps used to install it. This can be accomplished from below the ceiling, and the thermostat can be reinserted in the manner indicated previously after it has been repaired or replaced.

Figure 5:
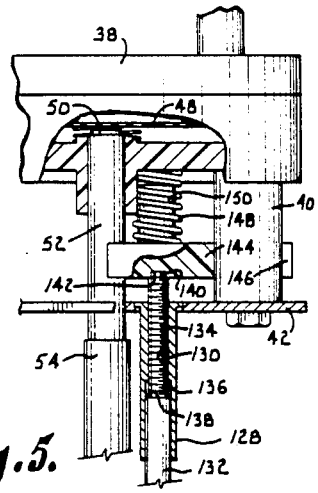
FIG. 5 is a fragmentary sectional view on an enlarged scale taken generally along line 5—5 of FIG. 3 in the direction of the arrows, with portions broken away for purposes of illustration.

The present invention also provides an improved adjustment mechanism which permits the maximum flow rate to be adjusted from a location below the ceiling. With particular reference to FIG. 5, the adjustment mechanism includes an elongated vertical sleeve 128 which is secured to and extends downwardly from the mounting bracket 42. A passage 130 is formed through sleeve 128 and is internally threaded at 130 on its upper portion. Preferably, the internal threads 130 extend for at least ½ inch longitudinally of sleeve 128. An elongated screw shank 132 extends closely through sleeve 128 and has threads 134 on its upper end portion, and the threads 134 engage the threads 130 of sleeve 128. Consequently, the turning of screw 132 in opposite directions advances and retracts the screw by threaded action.

The top end of screw 132 is provided with a cylindrical tip 140 which fits closely in a cylindrical pocket 142 formed in the lower surface of a bracket 144. Bracket 144 is secured to and extends sidewardly from the exhaust tube 52. A fork 146 is formed on the free end of bracket 144 and closely embraces one of the posts 40 which extend from the body of relay 38. The post 40 serves as a guide post which cooperates with the fork 146 to guide bracket 144 up and down and to prevent the bracket from wobbling or becoming cocked or otherwise disoriented. Engagement of peg 150 against the body of relay 38 limits upward movement of screw 136.

A compression spring 148 is coiled around a peg 150 which projects upwardly from bracket 144 at a location aligned with the axis of screw 132. Spring 148 acts against the bottom of the body of relay 38 at its top end and against bracket 144 at its bottom end, and the spring thereby continuously urges bracket 144 downwardly, with the force of the spring acting directly in line with screw 132 to assure that the tip 140 is maintained in pocket 142 at all times.

The height of the peg 150 is made so that when the screw 132 is screwed up tight, the exhaust port 52 is closed but cannot be closed so hard as to damage the diaphragm 48.

As best shown in FIG. 3, screw 132 extends downwardly and has its lower end located adjacent to the slot 32. The lower end of the screw is provided with a slot or hexagonal socket for receiving a screwdriver or wrench 152. A large cut-out 154 is formed in the foam block 114 to receive the lower end portion of screw 132. Another large cut-out 156 is formed in block 114 at a location directly below the port 72 in order to accommodate tube 74. During normal operation, these permit pressure equalization between the vent 65 in the relay and the space being controlled.

The wrench 152 can be applied to screw 132 from a location below the ceiling, and the wrench can be turned to turn screw 132 in order to adjust the maximum flow rate of the control. When the screw is turned in a direction to advance upwardly through sleeve 128, it forces bracket 144 upwardly, and this in turn moves the exhaust tube 52 upwardly such that its port 50 is moved closer to the diaphragm 48. Conversely, the screw 132 can be retracted to lower the exhaust tube 52 and thereby move port 50 away from diaphragm 48.

The relatively long unthreaded surfaces of screw 132 and sleeve 128 which are in contact with one another keep screw 132 in a vertical orientation and prevent it from wobbling or becoming disoriented. In addition, the close fit of the tip 140 in pocket 142 resists any tendency for the exhaust tube 52 to wobble, and the guiding and cooperation between fork 146 and post 40 further enhances the stability of the adjustment mechanism and resists any tendency for wobbling to occur. Because of the manner in which the parts are arranged, sleeve 128 prevents screw 132 from wobbling, and the fit of tip 40 in pocket 142 prevents bracket 144 from wobbling on the screw. Consequently, the mechanism acts reliably to precisely adjust port 50 relative to diaphragm 48, thereby providing a precise control of the maximum flow rate which is controlled by the extent to which air is exhausted through port 50.

It is thus evident that the present invention provides a control installation 10 which permits actual measurement to be made of the velocity of the discharging air due to the provisions of the Tee fitting 70 and the location of its port 72 such that it can be readily accessed from below the ceiling by the tube 74. In addition, the thermostat 26 can be installed and serviced from below the ceiling. The adjustment mechanism for the maximum flow rate is constructed in a manner to avoid wobbling or other disorientation of the exhaust tube, and it is readily accessible from below the ceiling. All of these features are achieved in an economical manner and with a compact unit that is housed above the ceiling so as not to detract from the appearance of the air delivery system.

The control components control the discharge of conditioned air into the space that is served in the manner described in the referenced Pat. No. 4,331,291 and the referenced application Ser. No. 775,533, to which reference may be made for a description of the operation of the control system.

In the event that it is desired to connect a particular control unit as a "slave" unit, the thermostat 26 is not used on that unit and the thermostat tubes 84 and 108 which extend from the control are pulled through the slot 116 in the foam block 114 and then are extended back up and through the cut-out 114 form through end plate 134.

In the event that it is desired to convert a slave unit to a stand alone unit as pressure regulator is added, and the thermostat is connected as described previously. If the pressure regulator was not in place originally, above-ceiling access is required to install it. For inaccessible ceiling constructions, one can install and power up a regulator but not use it to control a slave unit. If the tubes from the original master and the regulator thermosat port 78 are fed into the thermostat slot in the initial installation, the unit can be converted from a slave to a stand-alone unit, entirely from below the ciling at a later time. The thermostat tubes 84 and 108 can be reached through slot 32 and pulled downwardly out of the slot and connected with the thermostat which is to be added. The added thermostat can then be installed in the manner described previously.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In an air distribution system having a duct for receiving conditioned air, an outlet for discharging air from the duct to a conditioned space, pressure responsive actuator means for controlling the discharge of air through the outlet, a pneumatic control circuit for controlling said actuator means, and an exhaust tube in the control circuit slidable axially to adjust the maximum air flow rate through the outlet, the improvement comprising:
   a control compartment housing said control circuit and having a lower end;
   means for mounting said exhaust tube in the control compartment for generally up and down axial sliding movement to adjust the maximum air flow rate through the outlet;
   an elongate internally threaded sleeve secured in said control compartment at a fixed location offset from and generally parallel to the exhaust tube;
   a bracket extending from said exhaust tube and having a seat surface aligned with said sleeve at a location above the sleeve; and
   an elongate screw threaded through said sleeve and having a top end presenting a tip engaging said seat surface, said screw having a bottom end accessible through the lower end of said control compartment to effect turning of the screw to move the bracket and exhaust tube up and down for adjustment of the maximum air flow rate.

2. The improvement of claim 1, including means for urging said bracket toward said sleeve to maintain said seat surface and tip in engagement.

3. The improvement of claim 2, including:
   a generally vertical guide post offset from and substantially parallel to said exhaust tube and sleeve; and
   a guide surface on said bracket engaging said guide post in a manner to resist wobbling of the bracket as same is moved up and down.

4. The improvement of claim 1, wherein:
   said seat surface of the bracket presents a generally cylindrical pocket facing toward said sleeve; and
   said tip of the screw is a generally cylindrical tip fitting closely in said pocket to resist wobbling of the exhaust tube.

5. The improvement of claim 4, including means for urging said bracket toward said sleeve to maintain said tip in said pocket.

6. The improvement of claim 5, wherein said urging means comprises a spring element acting against said bracket in a manner to urge same downwardly and at a location aligned with said sleeve.

7. The improvement of claim 5, including:
   a generally vertical guide post offset from and substantially parallel to said exhaust tube and sleeve; and
   a guide surface on said bracket engaging said guide post in a manner to resist wobbling of the bracket as same is moved up and down.

8. The improvement of claim 1, wherein said internally threaded sleeve has internal threads extending at least one fourth inch in the direction of the sleeve axis.

9. The improvement of claim 1, including mating stop surfaces on said sleeve and screw for limiting the threaded extension of said screw through the sleeve.

10. An improved adjustment mechanism for a tube supported for axial sliding movement to adjust a pneumatic control circuit in an air distribution control system, said adjustment mechanism comprising:
    an elongate sleeve presenting an internally threaded axial passage;
    means for mounting said sleeve in a fixed position with said passage offset from and substantially parallel to the tube;
    a rigid bracket secured to and extending from the tube, said bracket presenting a generally cylindrical pocket therein aligned with and facing toward said passage of the sleeve;
    an elongate threaded screw extending through said sleeve and having a threaded connection with said passage to effect advancement and retraction of the screw upon turning thereof, said screw having a generally cylindrical tip closely received in said pocket; and
    means for urging said bracket toward said sleeve to thereby effect axial movement of said tube when said screw is turned in opposite directions.

11. The adjustment mechanism of claim 10, wherein said urging means comprises a spring element applying a force to said bracket at a location substantially aligned with said threaded passage.

12. The adjustment mechanism of claim 10, including:
    a guide post offset from and substantially parallel to said tube and sleeve; and a guide surface on said bracket guided along said guide post in a manner to resist wobbling of the bracket as same is moved toward and away from the sleeve.

13. The adjustment mechanism of claim 12, wherein said urging means comprises a spring element applying a force to said bracket at a location substantially aligned with said threaded passage.

14. The adjustment mechanism of claim 10, including making stop surfaces on the axis of said screw for limiting the advancement of the screw through the sleeve.

* * * * *